(12) United States Patent
Moyer et al.

(10) Patent No.: US 8,364,662 B1
(45) Date of Patent: Jan. 29, 2013

(54) SYSTEM AND METHOD FOR IMPROVING A SEARCH ENGINE RANKING OF A WEBSITE

(75) Inventors: Eric D. Moyer, Belmont, CA (US); Ramasubramaniam Gopal, Fremont, CA (US); Tapasvi Moturu, Sunnyvale, CA (US); Rina Rin-Song Chang, Saratoga, CA (US); Saravanan Coimbatore, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 1 day.

(21) Appl. No.: 13/206,425

(22) Filed: Aug. 9, 2011

(51) Int. Cl.
*G06F 7/00* (2006.01)
(52) U.S. Cl. ...................................................... 707/706
(58) Field of Classification Search .................. 707/706
See application file for complete search history.

Primary Examiner — Truong Vo
(74) Attorney, Agent, or Firm — Osha Liang LLP

(57) ABSTRACT

A method for managing a pre-existing website of a business includes receiving, from the business, business information comprising a business name, a location, an industry, an address, a phone number, and a business description, generating a business profile comprising the business information, obtaining, from a keyword provider, a plurality of keywords relating to the business, generating a title comprising the business name, the location, and the plurality of keywords, generating a footer comprising the industry, the address, the phone number, and the plurality of keywords, generating a website content item comprising the business description and the plurality of keywords, generating a first modified website based on the pre-existing website of the business, publishing the first modified website to a network, and inserting, into the business profile, a first hyperlink comprising a first uniform resource locator (URL) pointing to a first network location of the first modified website.

25 Claims, 10 Drawing Sheets

FIG.3

Business Directory 300

New York  Los Angeles  San Francisco  Houston  Portland  Seattle  Chicago

Businesses: Sign Up | Sign In

Use your free account to:
- Add your business to the Business Directory-optimized for search engines
- Get recommendations on landing new customers online
- Read reviews from existing customers Customize Your Business   Visit my profile → 305 VISIT MY PROFILE Address & Contact Information Section 306

Business name*: Internet Infrastructure Company → 307 BUSINESS NAME
Street Number*: 1234 → 308 STREET NUMBER
Street Name*: Ocean Avenue → 309 STREET NAME
Unit: → 310 UNIT ☐ Don't show my street address on my profile
City*: Manhattan Beach → 311 CITY
State*: CA → 312 STATE
Zip Code*: 90266 → 313 ZIP CODE
Business phone*: (310) - 123 - 4567   Enter Numbers Only → 314 BUSINESS PHONE
Fax number: 310-123-4568 → 315 FAX NUMBER
Contact email: contact@internetinfrastructurecompany.com → 316 CONTACT EMAIL
Website: http://internetinfrastructurecompany.com → 317 WEBSITE Enter the web address of your site. You can also *preview your website*. → 318 PREVIEW YOUR WEBSITE

*required fields

BUSINESS PROFILE SETUP 301

FIG. 4

BUSINESS PROFILE SETUP 400

Business Information Section 405

- PRIMARY CATEGORY 406 → Primary Category*: Computers & Networking
  Computers & Electronics > Communications & Networking
  *Enter a category that best describes your business*

- KEYWORDS 407 → Keywords: Internet, communications, networking, routing, infrastructure, routers, switching, switches
  *Enter up to 20 comma separated keywords or phrases (ex. Tomatoes, Vitamin C, Anti-oxidants)*

- BUSINESS DESCRIPTION 408 → Description: Internet Infrastructure Company is an Internet infrastructure provider. We are the one stop solution for all your corporate networking needs.

- PRODUCTS 409 → Products: routers, switches, cable, wireless, electronics

- SERVICES 410 → Services: service and installation

- INDUSTRIES SUPPORTED 411 → Industries supported: corporate infrastructure, electronics

- HOURS OF OPERATION 412 → Hours
  ☐ Open 24 hours
  | Mon | 6:00AM to 7:00PM | ☐ Closed |
  | Tues | 6:00AM to 7:00PM | ☐ Closed |
  | Wed | 6:00AM to 7:00PM | ☐ Closed |
  | Thu | 6:00AM to 7:00PM | ☐ Closed |
  | Fri | 6:00AM to 7:00PM | ☐ Closed |
  | Sat | Select to Select | ☒ Closed |
  | Sun | Select to Select | ☒ Closed |

- YEAR ESTABLISHED 413 → Year established: 2010

- PROFESSIONAL ASSOCIATIONS 414 → Professional associations: Association of Internet Infrastructure Providers

- AWARDS AND DISTINCTIONS 415 → Awards and distinctions: Internet Infrastructure Provider of the Year, 2010

Photo Section 416

- PHOTO URL 417 → Add photo URL: http://internetinfrastructurecompany.com

Message from the Business  605

Internet Infrastructure Company is an Internet Infrastructure provider. We are the one stop solution for all your corporate networking needs. We sell routers, switches, cable components, wireless components, and other networking hardware and electronics. We also provide service and installation of these components. Our specialty is setting up and managing your corporate infrastructure! Call us today for a free consultation!

Customer Reviews (1661)  610

Customer1  ★★★★☆ July 11, 2011
As a first time customer at Internet Infrastructure Company, I was extremely impressed with the professional service provided by the salespeople and the installers. I purchased a router and a switching component to augment my current setup. (more)

Customer2  ★★★★☆ June 5, 2011
If you're looking for top notch routing components and first class installation, go to Internet Infrastructure Company! I've been a customer for the last year, and I have nothing but praise! (more)

Customer3  ★★★★☆ June 4, 2011
The prompt service was commendable. The staff was very friendly and was very informative when I was trying to decide which switch I needed to buy. Highly recommended!

View more customer reviews

BUSINESS PROFILE 600

*FIG. 6*

SYSTEM AND METHOD FOR IMPROVING A SEARCH ENGINE RANKING OF A WEBSITE

BACKGROUND

Search engines allow users to search for information on the World Wide Web (i.e. the Internet). The search results generated by search engines are usually presented in a list of results arranged according to search engine rankings. The information presented may include websites, URLs, images, information, and other types of files. Most search engines are algorithmic in nature. Search engine ranking are often affected by the content of a website, the meta content of a website (such as title), the structure of content, keywords in the website, as well as links from other websites to the website. Generally, website management includes manually adjusting these elements.

SUMMARY

In general, in one aspect, the invention relates to a method for managing a pre-existing website of a business, including receiving, from the business, business information including a business name, a location, an industry, an address, a phone number, and a business description; generating a business profile including the business information; obtaining, from a keyword provider, a plurality of keywords relating to the business; generating a title including the business name, the location, and the plurality of keywords; generating a footer including the industry, the address, the phone number, and the plurality of keywords; generating a website content item including the business description and the plurality of keywords; generating a first modified website based on the pre-existing website of the business, where the first modified website comprises content from the pre-existing website, the title, the website content item, and the footer, and where the title is at a top portion of the first modified website, the website content item is in an interior portion of the first modified website, and the footer is at an exterior portion of the first modified website; publishing the first modified website to a network; and inserting, into the business profile, a first hyperlink including a first uniform resource locator (URL) pointing to a first network location of the first modified website.

In general, in one aspect, the invention relates to a system for managing a pre-existing website of a business, including a processor, and a website SEO application executing the on the processor and configured to receive, from the business, business information including a business name, a location, an industry, an address, a phone number, and a business description; generate a business profile including the business information; obtain, from a keyword provider, a plurality of keywords relating to the business; generate a title including the business name, the location, and the plurality of keywords; generate a footer including the industry, the address, the phone number, and the plurality of keywords; generate a website content item including the business description and the plurality of keywords; generate a first modified website based on the pre-existing website of the business, where the first modified website comprises content from the pre-existing website, the title, the website content item, and the footer, and where the title is at a top portion of the first modified website, the website content item is in an interior portion of the first modified website, and the footer is at an exterior portion of the first modified website; publish the first modified website to a network; and insert, into the business profile, a first hyperlink including a first uniform resource locator (URL) pointing to a first network location of the first modified website.

In general, in one aspect, the invention relates to a non-transitory computer readable storage medium storing instructions for managing a pre-existing website of a business, the instructions executable on a processor and including functionality to receive, from the business, business information including a business name, a location, an industry, an address, a phone number, and a business description; generate a business profile including the business information; obtain, from a keyword provider, a plurality of keywords relating to the business; generate a title including the business name, the location, and the plurality of keywords; generate a footer including the industry, the address, the phone number, and the plurality of keywords; generate a website content item including the business description and the plurality of keywords; generate a first modified website based on the pre-existing website of the business, where the first modified website comprises content from the pre-existing website, the title, the website content item, and the footer, and where the title is at a top portion of the first modified website, the website content item is in an interior portion of the first modified website, and the footer is at a bottom portion of the first modified website; publish the first modified website to a network; and insert, into the business profile, a first hyperlink including a first uniform resource locator (URL) pointing to a first network location of the first modified website.

Other aspects of the invention will be apparent from the following description and the appended claims.

BRIEF DESCRIPTION OF DRAWINGS

FIGS. 3 and 4 show examples of a business profile setup in accordance with one or more embodiments of the invention.

FIGS. 5 and 6 show examples of a business profile in accordance with one or more embodiments of the invention.

DETAILED DESCRIPTION

Figure 1:
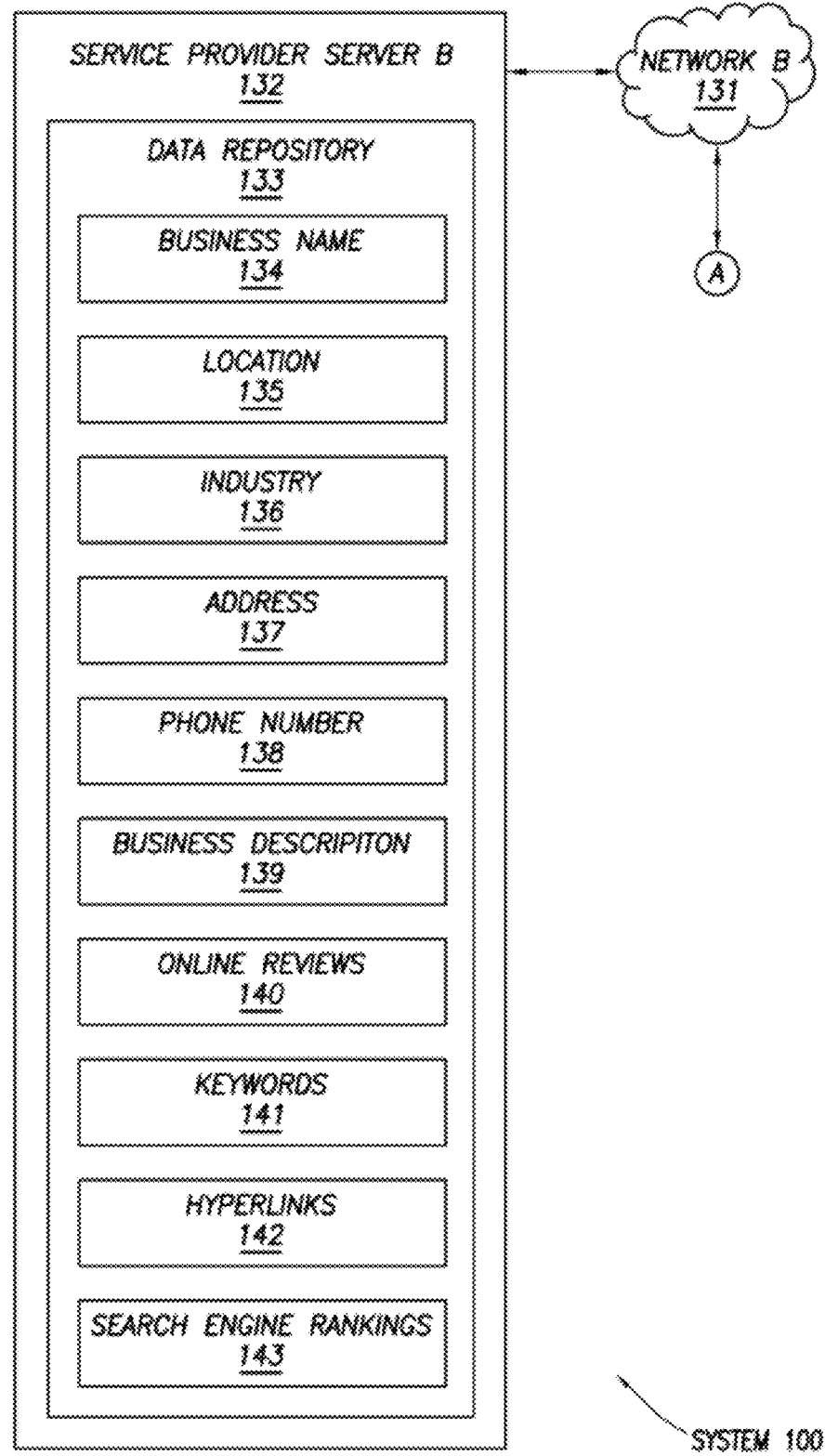
FIGS. 1 and 1A show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for modifying a website to increase a search engine ranking of the website. Specifically, meta attributes such as title, website content, a footer containing keywords, and links to the website may be added to a website. The title, website content, footer, and keywords and links may contribute to a more favorable search engine ranking. Those skilled in the art will appreciate that there may be numerous other embodiments of the invention beyond that detailed above.

Figure 1A:
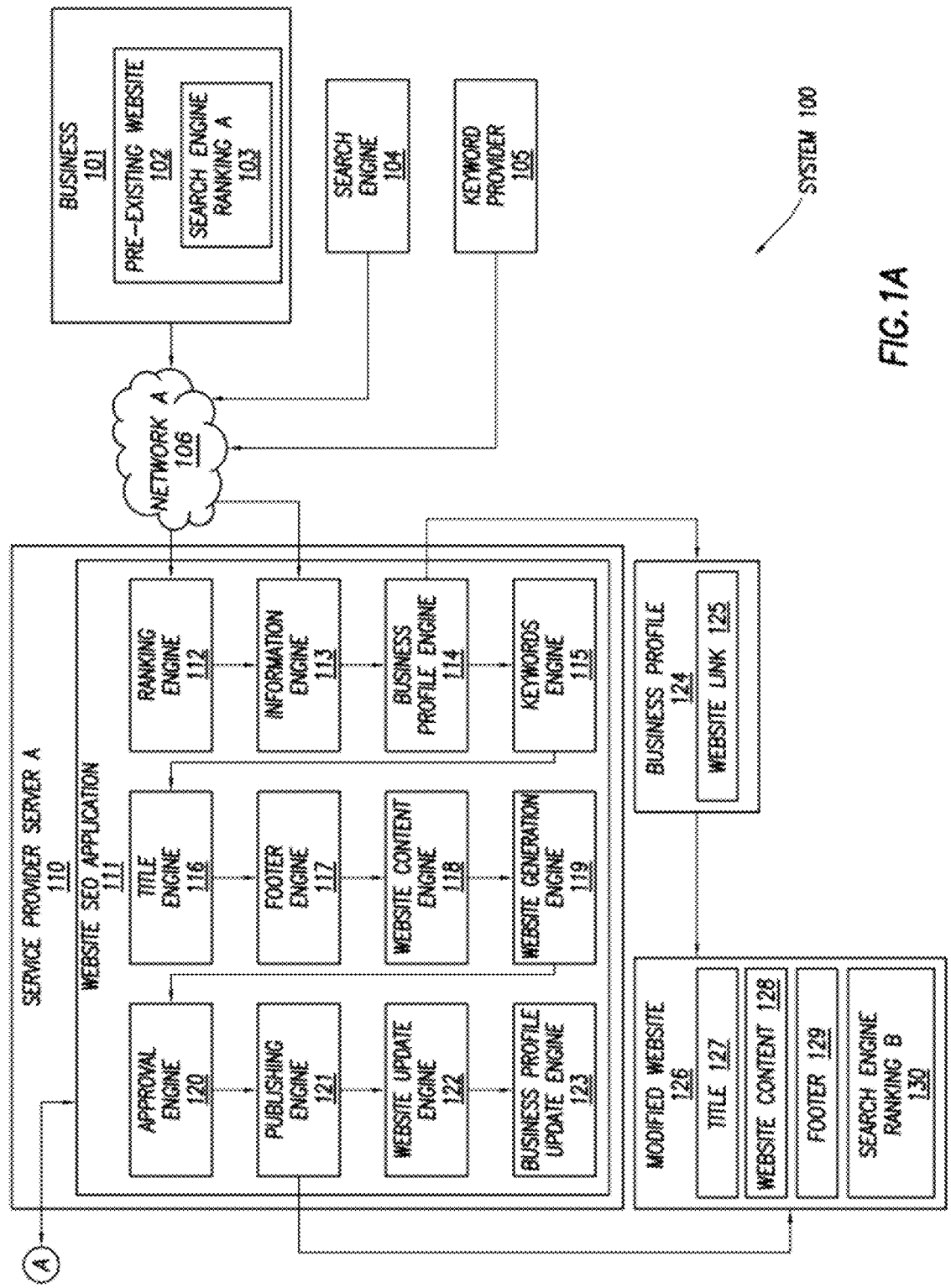

FIGS. 1 and 1A show a system (100) in accordance with one or more embodiments of the invention. As shown in FIGS. 1 and 1A, the system (100) includes components such as a search engine (104), a business (101), a service provider server A (110), a website SEO application (111), a service provider server B (132), a modified website (126), and a business profile (124). These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet, a wide area network (WAN), or a local area network (LAN)), with wired and/or wireless segments. In one or more embodiments of the invention, there may be more than one website SEO application running on a device, as well as more than one search engine and business interfacing with those components.

In one or more embodiments of the invention, a business (101) is an entity that engages in commerce. In other words, a business provides products and/or services to consumers in exchange for money. The business (101) may sell goods and/or services in a particular industry (e.g. telecommunications, Internet, flowers, retail). The business (101) may promote and sell its goods and/or services through a pre-existing website (102). The pre-existing website (102) is an online presence for the business (101), and acts as a marketing and distribution channel for the business (101). The pre-existing website (102) may be ranked by a search engine (104). The search engine ranking A (103) of the pre-existing website (102) may determine how prominently a link to the pre-existing website (102) is placed in the search results of a search engine (104).

An example of a good search engine ranking is one that appears close to the top of the search results list (e.g. on the first page of search results) generated by the search engine (104) when a user queries the search engine (104) using search terms. An example of a poor search engine ranking is one that appears after many other entries in a search results list (e.g. on the fifth page of search results) generated by the search engine (104) when a user queries the search engine (104) using search terms. The search engine ranking A (103) of the pre-existing website (102) may be calculated by the search engine (104) based on various factors, including the title, footer, content, and keywords of the pre-existing website (102). Therefore, the business (101) has a certain amount of control over what ranking the pre-existing website (102) receives from the search engine (104), and can affect this ranking by adjusting keywords, its title, webpage content, and footer. The business (101) and the search engine (104) may both transmit data (e.g. pre-existing website (102) and search engine ranking A (103)) to the website SEO application (111) over the network A (106).

In one or more embodiments of the invention, a service provider server A (110) is configured to host the website SEO application (111). Those skilled in the art will appreciate that the term "SEO" is an acronym for "search engine optimization", or the process of improving the visibility of a website in the organic search results of a search engine. The website SEO application (111) is a software application that includes several engines configured to perform specific functions to modify a website with content that will improve the ranking of the website in a search engine. Specifically, engines operating as part of the website SEO application (111) may include functionality to receive business information generate a business profile, obtain keywords relating to the business, generate a title for the website, generate a footer for the website, generate website content for the website, generate the website, publish the website to a network, link the business profile to the website through a hyperlink, and perform other calculations associated with improving the ranking of a website.

The website SEO application (111) may receive input from various sources, including the search engine (104) and the business (101). The website SEO application (111) may store and/or access data in/from a data repository (133). The service provider server A (110), the website SEO application (111), and other data stored on the service provider server A (110) may be owned and/or operated by a service provider (e.g. the owner, developer, and/or manager of the website SEO application (111)). Each engine of the website SEO application (111) is described below. Those skilled in the art will appreciate that each of the engines described may have other functionality beyond that disclosed, and that the functionality of each engine may alternatively be performed by any of the other engines.

In one or more embodiments of the invention, a ranking engine (112) is configured to determine search engine rankings. The ranking engine (112) may receive search engine rankings from the search engine (104) over network A (106). After receiving a search engine ranking, the ranking engine (112) may process (i.e. modify, transform, format) the search engine ranking, and then transmit the search engine ranking to the information engine (113) for further processing. In parallel, the ranking engine (112) may pass control of the system (100) to any other engine. The ranking engine (112) may use credentials of a user at the business (101). Specifically, in one or more embodiments, the user and/or business may provide credentials (e.g. a social security number, a birthdate, a user name, a password) to the website SEO application (111), which then stores this information internally in a user and/or business profile for use by the ranking engine (112). Alternatively, the user and/or business may be prompted by one or more engines within the website SEO application (111) when credentials are necessary. Those skilled in the art will appreciate that the ranking engine (112) may receive search engine rankings from other entities beyond the search engine (104), and may perform other functions beyond those disclosed.

In one or more embodiments of the invention, an information engine (113) is configured to receive business information. Business information is any data relating to a business, including but not limited to a business name, a location of the business, an industry in which the business operates, an address of the business, a phone number of the business, and a business description identifying what products and/or services the business provides. The information engine (113) may receive business information from the business (101). After receiving business information, the information engine (113) may process (i.e. modify, transform, format) the business information, and then transmit the business information to the business profile engine (114) for further processing. In parallel, the information engine (113) may pass control of the system (100) to any other engine. Those skilled in the art will appreciate that the information engine (113) may receive business information from other entities beyond the business (101), and may perform other functions beyond those disclosed.

In one or more embodiments of the invention, a business profile engine (114) is configured to generate a business profile. A business profile is a website hosted by a service provider that is accessible through a network. A business profile contains the business information (e.g. business name, location, industry, address, phone number, business description) of a business, and provides a way for consumers of the products and/or services of the business to learn about the business. The business profile engine (114) may receive the business information from the information engine (113). After receiving the business information, the business profile engine (114) may process (i.e. modify, transform, format) the business information, generate the business profile (124), and then transmit the business profile (124) to the keywords engine (115) for further processing. In parallel, the business profile engine (114) may pass control of the system (100) to any other engine. Those skilled in the art will appreciate that the business profile engine (114) may receive business information from other entities beyond the information engine (113), and may perform other functions beyond those disclosed.

In one or more embodiments of the invention, a keywords engine (115) is configured to obtain keywords relating to the business. Keywords are words that describe the business (e.g. products, services, payment methods, rankings, location, industry), and are used by search engines to rank a website of the business. The keywords engine (115) may receive the keywords from a keyword provider (105). The keyword provider is an entity that periodically provides the website SEO application (111) with updated keywords, or keywords that may contribute to a better ranking of the website of the business by a search engine. After receiving the keywords, the keywords engine (115) may process (i.e. modify, transform, format) the keywords, and then transmit the keywords to a title engine (116) for further processing. In parallel, the keywords engine (115) may pass control of the system (100) to any other engine. Those skilled in the art will appreciate that the keywords engine (115) may receive keywords from other entities beyond the keyword provider (105), and may perform other functions beyond those disclosed.

In one or more embodiments of the invention, a title engine (116) is configured to generate a title for a website. A title is the portion of a website that is displayed at the top of a browser in which the website is viewed, and is a meta property of the website. The title may include, but is not limited to a business name, a location of the business, and keywords associated with the business. The title engine (116) may receive the business name, a location of the business, and the keywords from the keywords engine (115). After receiving this data, the title engine (116) may process (i.e. modify, transform, format) it, generate a title, and then transmit the title to the footer engine (117) for further processing. In parallel, the title engine (116) may pass control of the system (100) to any other engine. Those skilled in the art will appreciate that the title engine (116) may receive a business name, a location of the business, and keywords relating to the business from other entities beyond the keywords engine (115), and may perform other functions beyond those disclosed.

In one or more embodiments of the invention, a footer engine (117) is configured to generate a footer. A footer is an exterior (e.g., edge, bottom, side, and/or top) portion of a website and contains information and hyperlinks including, but not limited to, an industry of a business, an address of the business, a phone number of the business, keywords associated with the business, and links to other pages on the website. The footer engine (117) may receive this information from the title engine (116) or the keywords engine (115). After receiving this information, the footer engine (117) may process (i.e. modify, transform, format) it, generate a footer using it, and then transmit the footer to a website content engine (118) for further processing. In parallel, the footer engine (117) may pass control of the system (100) to any other engine. Those skilled in the art will appreciate that the footer engine (117) may receive the industry, the address, the phone number, and the keywords from other entities beyond the title engine (116), and may perform other functions beyond those disclosed.

In one or more embodiments of the invention, a website content engine (118) is configured to generate a website content item. A website content item is a portion of a website that typically resides in the center (e.g., away from the edges, interior, top, bottom, and/or side) of the website, and may include information such as a description of the products and/or services of the business, and keywords. The website content engine (118) may receive this information from the footer engine (117). After receiving this information, the website content engine (118) may process (i.e. modify, transform, format) it, generate the website content item using it, and then transmit the website content item to a website generation engine (119) for further processing. In parallel, the website content engine (118) may pass control of the system (100) to any other engine. Those skilled in the art will appreciate that the website content engine (118) may receive the business description and the keywords from other entities beyond the footer engine (117), and may perform other functions beyond those disclosed.

In one or more embodiments of the invention, a website generation engine (119) is configured to generate a website. Specifically, the website generation engine (119) may generate a modified version of a website based on an earlier version of the website, where the modified version of the website contains the content of the earlier version of the website, as well as the title, the website content item, and the footer generated by the previously described engines. These extra elements (e.g. the title, the website content item, and the footer) may contribute to a higher search engine ranking of the modified version of the website than a previous search engine ranking of the earlier version of the website. The website generation engine (119) may receive the title, the website content item, and the footer from the title engine (116), the website content engine (118), and the footer engine (117), respectively. After receiving the title, the website content item, and the footer, the website generation engine (119) may process (i.e. modify, transform, format) these components, generate the modified website using these components, and then transmit the modified website to the approval engine (120) for further processing. In parallel, the website generation engine (119) may pass control of the system (100) to any other engine. Those skilled in the art will appreciate that the website generation engine (119) may receive the title, the website content item, and the footer from other entities beyond the title engine (116), the website content engine (118), and the footer engine (117), and may perform other functions beyond those disclosed.

In one or more embodiments of the invention, an approval engine (120) is configured to receive an approval from a business to publish the modified website on a network (e.g. the Internet). The approval engine (120) may receive the approval from, for example, the business (101). After receiving the approval, the approval engine (120) may process (i.e. modify, transform, format) the approval, and then transmit the approval to a publishing engine (121) for further processing. In parallel, the approval engine (120) may pass control of the system (100) to any other engine. Those skilled in the art will appreciate that the approval engine (120) may receive an approval to publish a website from other entities beyond the business (101), and may perform other functions beyond those disclosed.

In one or more embodiments of the invention, a publishing engine (121) is configured to publish the modified website to a network (e.g. the Internet) with an approval. Publishing a website to a network includes making the website accessible by any user that is on the network. The publishing engine (121) may obtain the approval from the approval engine (120). For example, the publishing engine (121) may publish the modified website (126) to the Internet. The modified website (126) may contain a title (127) generated by the title engine (116), website content (128) generated by the website content engine (118), and a footer (129) generated by the footer engine (117). The modified website (126) may also be associated with a search engine ranking B (130), obtained from a search engine (104). Additionally, the modified website (126) may be pointed to by a website link (125) in the business profile (124). In other words, a user may be directed to the modified website (126) by clicking on the website link (125) on the business profile (124). After publishing a website, the publishing engine (121) may pass control of the system (100) to a website update engine (122), or any other engine. Those skilled in the art will appreciate that the publishing engine (121) may receive an approval to publish a website from other entities beyond the approval engine (120), and may perform other functions beyond those disclosed.

In one or more embodiments of the invention, a website update engine (122) is configured to update a website with updated keywords, an updated title, updated website content, and an updated footer. For example, the updated title, updated website content, and updated footer may contain updated keywords obtained from the keyword provider (105). The website update engine (122) may generate the updated title, updated website content, and updated footer. After generating these items, the website update engine (122) may process (i.e. modify, transform, format) these items, update the website with these items, and then pass control of the system (100) to a business profile update engine (123) or any other engine of the website SEO application (111). Those skilled in the art will appreciate that the website update engine (122) may receive updated keywords from other entities beyond the keyword provider (105), and may perform other functions beyond those disclosed.

In one or more embodiments of the invention, a business profile update engine (123) is configured to update a business profile. Updating a business profile may include updating online reviews of a business in the business profile, or updating website links to a website of the business in the business profile. The business profile update engine (123) may obtain online reviews from various sources (e.g. blogs, user review websites, forums, social networking websites, etc.). After updating the business profile, the business profile update engine (123) may process (i.e. modify, transform, format) the updated business profile, and then pass control of the system (100) to another engine of the website SEO application (111). Those skilled in the art will appreciate that the business profile update engine (123) may obtain online reviews from numerous sources, and may perform other functions beyond those disclosed.

In one or more embodiments of the invention, a service provider server B (132) is configured to host a data repository (133). The data repository (133) may contain data associated with the website SEO application (111). The data repository (133) may be a relational database that stores data entries associated with the website SEO application (111). The data repository (133) may also be a spreadsheet containing data cells associated with the website SEO application (111). In one or more embodiments of the invention the data repository (133) may be implemented with many technologies. The data repository (133) may receive data from various sources, including the website SEO application (111), and any of the engines of the website SEO application (111), over network B (131). The data may include, but is not limited to, a business name (134), a location (135), an industry (136), an address (137), a phone number (138), a business description (139), online reviews (140), keywords (141), hyperlinks (142), and search engine rankings (143). After receiving data from the website SEO application (111), the data repository (133) may process (i.e. modify, transform, format) the data, and then store the data. Those skilled in the art will appreciate that the data repository (133) may receive and store data from other entities beyond the website SEO application (111), and may perform other functions beyond those disclosed. Further, the service provider server B (132), and the data stored on this server may be owned and/or operated by a service provider (e.g. the owner, developer, and/or manager of the website SEO application (111)).

In one or more embodiments of the invention, a GUI may display information associated with the website SEO application (111). The GUI may be viewed in a web browser, an application window, and the like. The GUI may be viewed in these display technologies by a user of the website SEO application (111). The GUI may include standard web elements, including video, audio, and text, as well as interface technologies not limited to text submission on forms, voice capture, and user gesture interpretation. In one or more embodiments of the invention there may be various other display technologies used to view the GUI.

Figure 2:
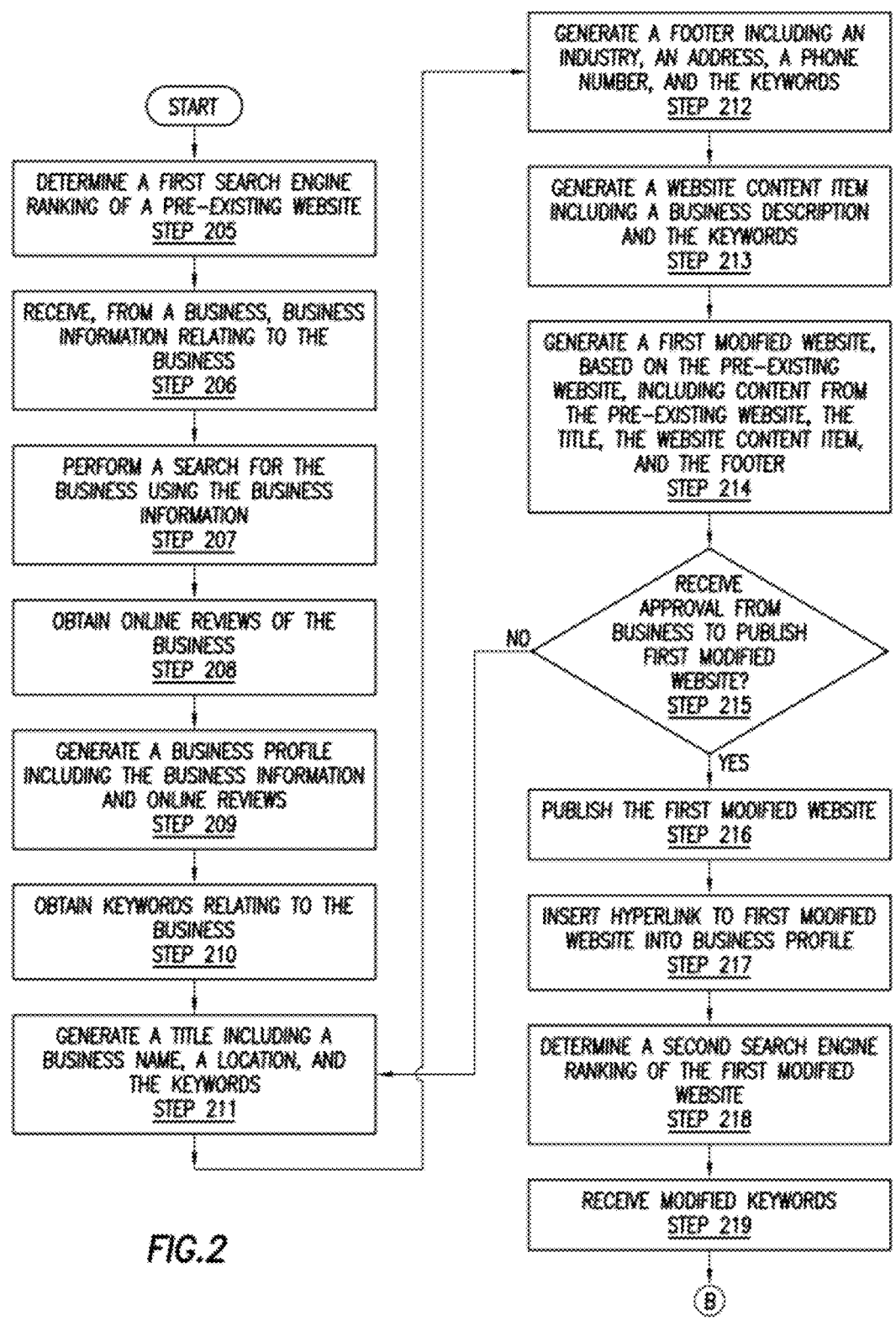
FIGS. 2 and 2A show a flowchart in accordance with one or more embodiments of the invention.
Figure 2A:
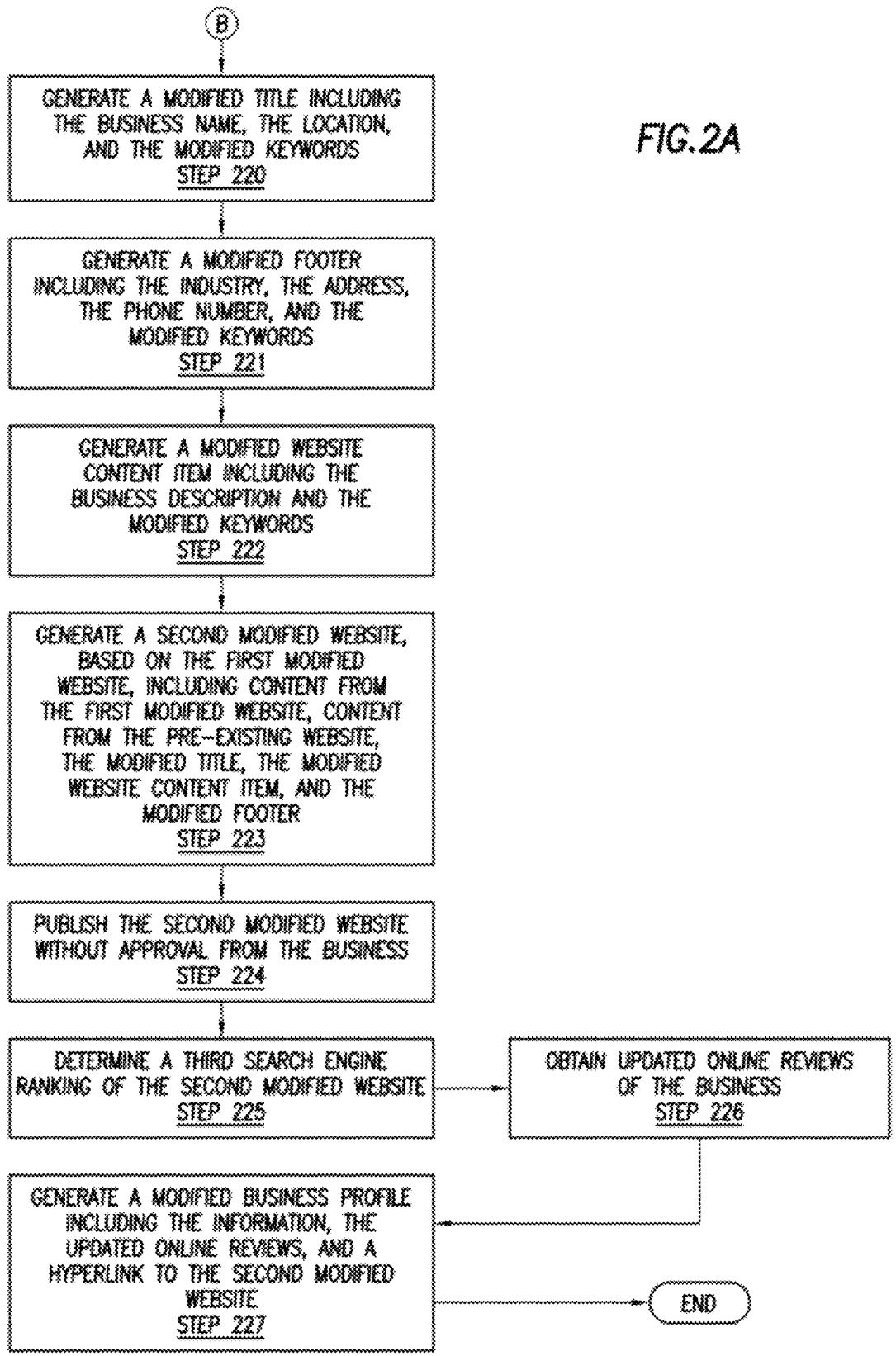

FIGS. 2 and 2A show a flowchart in accordance with one or more embodiments of the invention. The process shown in FIGS. 2 and 2A may be used, for example, with the system (100) to generate a modified website that has a better search engine ranking than a previous website. The sequence of steps shown in FIGS. 2 and 2A may differ among embodiments of the invention, and one or more of the steps may be performed in parallel and/or may be optional.

In STEP 205, a first search engine ranking of a pre-existing website is determined. The ranking may be the position of the pre-existing website in a list of search results generated by a search engine. For example, the first search engine ranking of the pre-existing website may be number 10 in a list of search results.

In STEP 206, business information relating to a business is received from the business. The business information may include, for example, the name of the business (e.g. "Internet Infrastructure Company"), a location of the business (e.g. "Manhattan Beach, Calif."), an industry in which the business operates (e.g. "Communications & Networking"), an address of the business (e.g. "1234 Ocean Avenue, Manhattan Beach, Calif., 90266, USA"), a phone number of the business (e.g. "310.123.4567"), and a business description identifying what products and/or services the business provides (e.g. "Internet Infrastructure Company is an Internet infrastructure provider. We are the one stop solution for all your corporate networking needs.").

In STEP 207, a search for the business is performed using the business information. The search may be performed, for example, in a data repository owned and/or maintained by a service provider. The data repository may, for instance, contain business profiles of businesses. If the search fails to identify a pre-existing business profile associated with the information, then a business profile may be generated (in STEP 209).

In STEP 208, online reviews of the business are obtained. The online reviews may be obtained, for example, from blogs, business review websites, and other sources on the Internet.

The online reviews may include comments made by users that have had positive or negative experiences purchasing products and/or services from the business, as well as ratings of the business made by the users (e.g. "4/5 stars").

In STEP 209, a business profile of the business is generated. The business profile may be generated when, for example, the search for a pre-existing business profile in STEP 207 does not return any results. The business profile may contain the business information obtained in STEP 206. The profile may therefore contain the following information: the name of the business (e.g. "Internet Infrastructure Company"), the location of the business (e.g. "Manhattan Beach, Calif."), the industry in which the business operates (e.g. "Communications & Networking"), the address of the business (e.g. "1234 Ocean Avenue, Manhattan Beach, Calif., 90266, USA"), the phone number of the business (e.g. "310.123.4567"), and the business description (e.g. "Internet Infrastructure Company is an Internet infrastructure provider. We are the one stop solution for all your corporate networking needs.").

In STEP 210, keywords relating to the business are obtained. The keywords may be obtained from, for example, a keyword provider, or an entity that generates keywords that may contribute to favorable search engine rankings. The keywords for Internet Infrastructure Company may include, for example, the terms "Internet", "communications", "networking", "routing", "infrastructure", "routers", "switching", and "switches". The keywords may be terms relating to, and describing, the function, capacity, operations, industry, products, and/or services of the business.

In STEP 211, a title for the website of the business is generated. The title of the website is displayed across the top of a browser in which the website is viewed. The title may include, for example, the business name (e.g. "Internet Infrastructure Company"), the location of the business (e.g. "Manhattan Beach, Calif."), and the keywords (e.g. "Internet", "communications", "networking", "routing", "infrastructure", "routers", "switching", "switches"). The title of a website is very important for search engine results because it is the title that is displayed as a link to users in the search engine results. Therefore, when a user of a search engine performs a search, the user is presented the contents of the title as a link to the website. It is, therefore, generally helpful for the title of a website to be as descriptive as possible. The title may also be used in determining the ranking of a website by a search engine; therefore it is beneficial for a website of the business to have as identifying a title as possible.

In STEP 212, a footer for the website of the business is generated. The footer is generally displayed at an exterior portion (e.g., edge, side, top, and/or bottom) of a website, and may include content identifying the business. For example, the footer may include the industry in which the business operates (e.g. "Communications & Networking"), the address of the business (e.g. "1234 Ocean Avenue, Manhattan Beach, Calif., 90266, USA"), the phone number of the business (e.g. "310.123.4567"), and the keywords (e.g. "Internet", "communications", "networking", "routing", "infrastructure", "routers", "switching", "switches"). The contents contained in the footer may also be used in determining the ranking of a website by a search engine; therefore it is beneficial for a website of the business to have as identifying a footer as possible.

In STEP 213, a website content item for a website of a business is generated. The website content item is generally displayed in the interior portion (i.e., interior, away for the edges, etc.) of a website, and may include content identifying the business and its products and/or services. For example, the website content item may include the business description (e.g. "Internet Infrastructure Company is an Internet infrastructure provider. We are the one stop solution for all your corporate networking needs."), and the keywords (e.g. "Internet", "communications", "networking", "routing", "infrastructure", "routers", "switching", "switches"). The website content item may also be used in determining the ranking of a website by a search engine; therefore it is beneficial for a website of the business to have as descriptive a website content item as possible.

In STEP 214, a first modified website is generated. The first modified website may be, for example, based on a pre-existing website of a business, with the title, website content item, and footer added. Since the first modified website may be based on the pre-existing website, the content of the pre-existing website may be included in the first modified website. The first modified website is generated as an updated version of the pre-existing website in the effort to increase the search engine ranking of the website when it is updated to the first modified website.

In STEP 215, it is determined if an approval to publish the first modified website is received from the business. If the approval is received, then the process proceeds to STEP 216, otherwise it proceeds back to STEP 211.

In STEP 216, the first modified website is published. Publishing the first modified website may include, for example, making the first modified website accessible to users on the Internet at a specific URL (e.g. "http://www.internetinfrastructurecompany.com"). Those skilled in the art will appreciate that there may be many actions required to publish a website to a network, and that the system described may perform all of these steps in a completely automated fashion.

In STEP 217, a hyperlink to the first modified website is inserted into the business profile. For example, the hyperlink on the business profile may contain the URL "http://www.internetinfrastructurecompany.com", which allows a user to be directed to the first modified website from the business profile. The number of hyperlinks pointing to a website may also be used in determining the ranking of the website by a search engine; therefore it is beneficial for a business to have as many legitimate hyperlinks pointing towards it from other websites as possible.

In STEP 218, a second search engine ranking of the first modified website is determined. The second search engine ranking may, for example, be obtained after some time has passed, and search engines have re-indexed and re-ranked the website. The second search engine ranking may be higher than the first search engine ranking of the pre-existing website, because the first modified website has been modified to include the title, website content item, footer, and keywords, which may have contributed positively towards a higher search engine ranking. For example, the second search engine ranking may be 5th from the top on a list of search engine results.

In STEP 219, modified keywords are received. The modified keywords may be received from, for example, a keyword provider, and may be "better" keywords than the original set of keywords obtained in STEP 210 with respect to search engine rankings. The modified keywords for Internet Infrastructure Company may include, for example, the terms "Internet", "communications", "networking", "infrastructure", "routers", "switches", "Manhattan", "CA", "discount", and "sale". The modified keywords may include some of the same terms as the old set of keywords, and may include some new terms.

In STEP 220, a modified title is generated. The modified title of the website is displayed across the top of a browser in which the website is viewed. The modified title may include, for example, the business name (e.g. "Internet Infrastructure Company"), the location of the business (e.g. "Manhattan Beach, Calif."), and the modified keywords (e.g. "Internet", "communications", "networking", "infrastructure", "routers", "switches", "Manhattan", "CA", "discount", "sale"). The modified title may also be used in determining the ranking of a website by a search engine; therefore it may be beneficial for the website of the business to have a modified title that is as identifying as possible.

In STEP 221, a modified footer is generated. The modified footer is generally displayed at the bottom of a website, and may include content identifying the business. For example, the modified footer may include the industry in which the business operates (e.g. "Communications & Networking"), the address of the business (e.g. "1234 Ocean Avenue, Manhattan Beach, Calif., 90266, USA"), the phone number of the business (e.g. "310.123.4567"), and the modified keywords (e.g. "Internet", "communications", "networking", "infrastructure", "routers", "switches", "Manhattan", "CA", "discount", "sale"). The modified footer may also be used in determining the ranking of a website by a search engine; therefore it may be beneficial for the website of the business to have a modified footer that is as descriptive as possible.

In STEP 222, a modified website content item is generated. The modified website content item is generally displayed in the center of a website, and may include content identifying the business and its products and/or services. For example, the modified website content item may include the business description (e.g. "Internet Infrastructure Company is an Internet infrastructure provider. We are the one stop solution for all your corporate networking needs."), and the modified keywords (e.g. "Internet", "communications", "networking", "infrastructure", "routers", "switches", "Manhattan", "CA", "discount", "sale"). The modified website content item may also be used in determining the ranking of a website by a search engine; therefore it is beneficial for a website of the business to have a modified website content item that is as descriptive as possible.

In STEP 223, a second modified website is generated. The second modified website may be, for example, based on the first modified website, with the modified title, modified website content item, and modified footer added. Since the second modified website may be based on the first modified website, the content of the first modified website and the pre-existing website (which the first modified website was based on) may be included in the second modified website. The second modified website is generated as an updated version of the first modified website in the effort to increase the search engine ranking of the first modified website when it is updated to the second modified website (and includes the modified keywords).

In STEP 224, the second modified website is published. Publishing the second modified website may include, for example, making the second modified website accessible to users on the Internet at the URL of the first modified website (e.g. "http://www.internetinfrastructurecompany.com"). Further, the second modified website may include more website pages than the first website pages; these extra pages are published to unique URLs (e.g. "http://www.internetinfrastructurecompany.com/deals.html"), with new hyperlinks to the extra pages added to the footer. The publishing of the second modified website may occur without the intervention or approval of a user and/or business. Therefore, this process may occur in a completely automated fashion, every time updated keywords are obtained from a keyword provider. In this way, the system may periodically update a website with improved keywords, and the search engine ranking of the website may increase over time.

In STEP 225, a third search engine ranking is determined. The third search engine ranking may, for example, be obtained after some time has passed, and search engines have re-indexed and re-ranked the website. The third search engine ranking may be higher than the second search engine ranking of the first modified website, because the second modified website has been modified to include the modified title, modified website content item, modified footer, and modified keywords, which may have contributed positively towards a higher search engine ranking. For example, the third search engine ranking may be the 1st (i.e. the top) in a list of search engine results.

In STEP 226, updated online reviews of the business are obtained. The updated online reviews may be obtained, for example, from blogs, business review websites, and other sources on the Internet. The updated online reviews may include comments made by users that have had positive or negative experiences purchasing products and/or services from the business, as well as ratings of the business made by the users (e.g. "4/5 stars"). The updated online reviews may be more recent, more detailed, and of higher quality than the original reviews obtained in STEP 208. Higher quality reviews may contribute to a higher general public impression of the business, its capabilities, its services, and its products.

In STEP 227, a modified business profile is generated. The modified business profile may contain the business information, the updated online reviews, and a hyperlink to the second modified website. The profile may therefore contain the following information: the name of the business (e.g. "Internet Infrastructure Company"), the location of the business (e.g. "Manhattan Beach, Calif."), the industry in which the business operates (e.g. "Communications & Networking"), the address of the business (e.g. "1234 Ocean Avenue, Manhattan Beach, Calif., 90266, USA"), the phone number of the business (e.g. "310.123.4567"), the business description (e.g. "Internet Infrastructure Company is an Internet infrastructure provider. We are the one stop solution for all your corporate networking needs."), the updated online reviews (e.g. "customer1 review, 4/5 stars", "customer2 review, 3.5/5 stars", "customer3 review, 4.5 stars"), and the hyperlink(s) to the second modified website (e.g. "http://www.internetinfrastructurecompany.com", "http://www.internetinfrastructurecompany.com/deals.html").

FIGS. 3 and 4 show an example business profile setup in accordance with one or more embodiments of the invention. The business profile setup shown in FIGS. 3 and 4 may be used, for example, with the system (100) to populate a business profile. The elements shown in FIGS. 3 and 4 may differ among embodiments of the invention, and one or more of the elements may be optional.

In FIG. 3, a business directory (300) contains a business profile setup (301). The business directory may be an online website that contains the business profiles of businesses that are members of a website search engine ranking improvement service provided by a service provider. The business directory may be searchable by company name, address, telephone number, and other similar information. The business profile setup (301) may be a webpage that accepts information from a user of a business, in order to build a business profile for the business. This may be performed using, in part, an address and contact information section (306). Contact information may include a business name (307) (e.g. "Internet Infrastructure Company"), a street number (308) (e.g. "1234"), a street name (309) (e.g. "Ocean Avenue"), a unit (310) (e.g. "20"), a city (311) (e.g. "Manhattan Beach"), a state (312) (e.g.

"CA"), a zip code (313) (e.g. "90266"), a business phone (314) (e.g. "(310) 123-4567"), a fax number (315) (e.g. "310-123-4568"), a contact email (316) (e.g. "contact@internetinfrastructurecompany"), and a website (317) (e.g. "http://internetinfrastructrecompany.com"). While entering this information, a user may also preview the business profile or the website by clicking on the "visit my profile" (305) link or the "preview your website" (318) link.

In FIG. 4, the process of populating the business profile is continued in the business profile setup (400). This page includes a business information section (405), and a photo section (416). A business may enter information in the business information section (405), including a primary category (406) that the business falls into (e.g. "Computers & Electronics>Communications & Networking"), keywords (407) associated with the business (e.g. "Internet", "communications", "networking", "routing", "infrastructure", "routers", "switching", "switches"), a business description (408) (e.g. "Internet Infrastructure Company is an Internet infrastructure provider. We are the one stop solution for all your corporate networking needs."), products (409) sold by the business (e.g. "routers", "switches", "cable", "wireless", "electronics"), services (410) sold by the business (e.g. "service and installation"), industries supported (411) by the business (e.g. "corporate infrastructure, electronics"), hours of operation (412) of the business (e.g. "open Monday-Friday, 6:00 am-7:00 pm, closed Saturday and Sunday"), the year the business was established (413) (e.g. "2010"), professional associations (414) that the business is a member of (e.g. "Association of Internet Infrastructure Providers"), and awards and distinctions (415) that the business has received (e.g. "Internet Infrastructure Provider of the Year, 2010"). The hours of operation (412) may be input by a user in the form of drop down and radio box selections. The photo section (416) allows a user to add the URL of a photo (417) or logo of the business, for use in the business profile (e.g. "http://internetinfrastructurecompany.com/logo.jpg"). Those skilled in the art will appreciate that there may be various other types of information collected from a user by the business profile setup (400).

Figure 5:
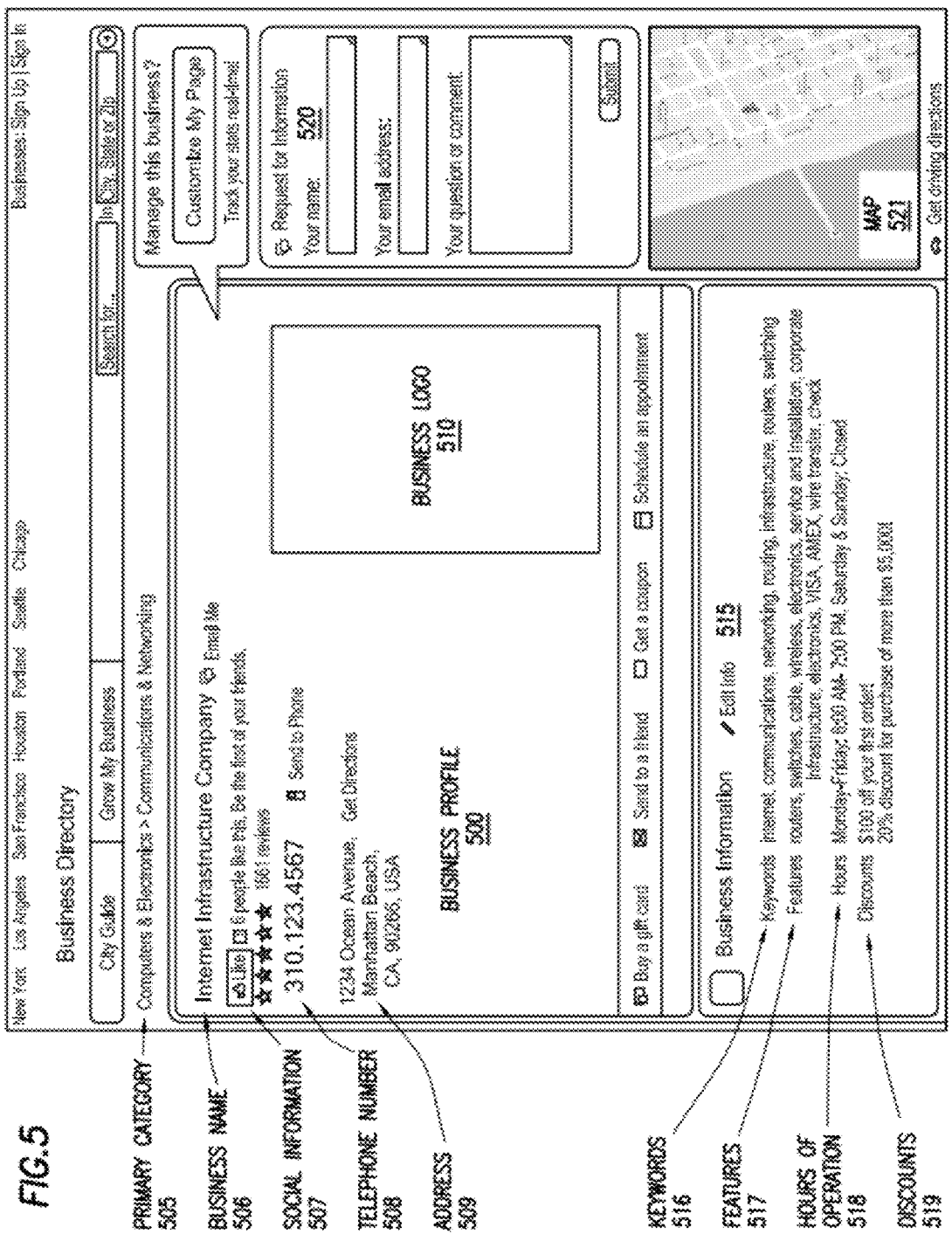

FIGS. 5 and 6 show an example business profile in accordance with one or more embodiments of the invention. The business profile shown in FIGS. 5 and 6 may be used, for example, with the system (100) to display information of a business. The elements shown in FIGS. 5 and 6 may differ among embodiments of the invention, and one or more of the elements may be optional.

In FIG. 5, a business profile (500) is displayed in a business directory. The business profile (500) may include information including a primary category (505) that the business falls into (e.g. "Computers & Electronics>Communications & Networking"), the name of the business (506) (e.g. "Internet Infrastructure Company"), social information (507) such as the number of "likes" of the business profile on a social network, the number of reviews of the business, and the average rating of the business according to the reviews, a telephone number (508) of the business (e.g. "310.123.4567"), an address (509) of the business (e.g. "1234 Ocean Avenue, Manhattan Beach, Calif., 90266, USA"), and a logo of the business (510) or an image relating to the business.

In one or more embodiments of the invention, the business information (515) section may contain information such as keywords (516) associated with the business (e.g. "Internet", "communications", "networking", "routing", "infrastructure", "routers", "switching", "switches"), features (517) of the business (e.g. "routers", "switches", "cable", "wireless", "electronics", "service and installations", "corporate infrastructure", "electronics", "VISA", "AMEX", "wire transfer", "check"), hours of operation (518) of the business (e.g. "Monday-Friday: 6:00 AM-7:00 PM, Saturday & Sunday: Closed"), and discounts (519) currently offered by the business (e.g. "$100 off your first order!", "20% discount for purchase of more than $5,000!"). The business profile (500) may also have a request for information (520) section, where a user may make a request to the business for more information about specific products and/or services offered by the business. Additionally, the business profile (500) may have a map (521) of its location. A user may send the telephone number of the business or driving directions to the business to his or her email, mobile phone, or other device. Additionally, a user may buy a gift card to the business for another customer, send the business profile to a friend via email, get a coupon for a product and/or service offered by the business, and schedule an appointment with the business. A user may also directly send the business an email, through an email hyperlink. The business associated with the business profile (500) may edit the business information (515), further customize the business profile (500), and track statistics of users accessing the business profile (500) in real-time (e.g. number of hits per day, hyperlinks that users click on, areas of the business profile (500) accessed).

In FIG. 6, business profile (600) may further contain a message from the business (605), and customer reviews (610). The message from the business (605) may be a description of the business for customers, such as "Internet Infrastructure Company is an Internet infrastructure provider. We are the one stop solution for all your corporate networking needs. We sell routers, switches, cable components, wireless components, and other networking hardware and electronics. We also provide service and installation of these components. Our specialty is setting up and managing your corporate infrastructure! Call us today for a free consultation!" The customer reviews (610) may contain reviews submitted by customers about the business. For example, Customer1 may have submitted a review on Jul. 11, 2011, rating the business 5 stars out of 5 stars, with the following message—"As a first time customer at Internet Infrastructure Company, I was extremely impressed with the professional service provided by the salespeople and the installers. I purchased a router and a switching component to augment my current setup".

Further, Customer2 may have submitted a review on Jun. 5, 2011, rating the business 5 stars out of 5 stars, with the following message—"If you're looking for top notch routing components and first class installation, go to Internet Infrastructure Company! I've been a customer for the last year, and I have nothing but praise!" Additionally, Customer3 may have submitted a review on Jun. 4, 2011, rating the business 4 stars out of 5 stars, with the following message—"The prompt service was commendable. The staff was very friendly and has very informative when I was trying to decide which switch I needed to buy. Highly recommended!" From the customer reviews (610) section, a customer and/or a business may view more reviews by clicking the "View more customer reviews" hyperlink. Those skilled in the art will appreciate that there may be various other types of information displayed on the business profile (600) that have not been described. Essentially, any type of information associated with the business, its products, its services, and its operations may be part of the business profile (600).

Figure 7:
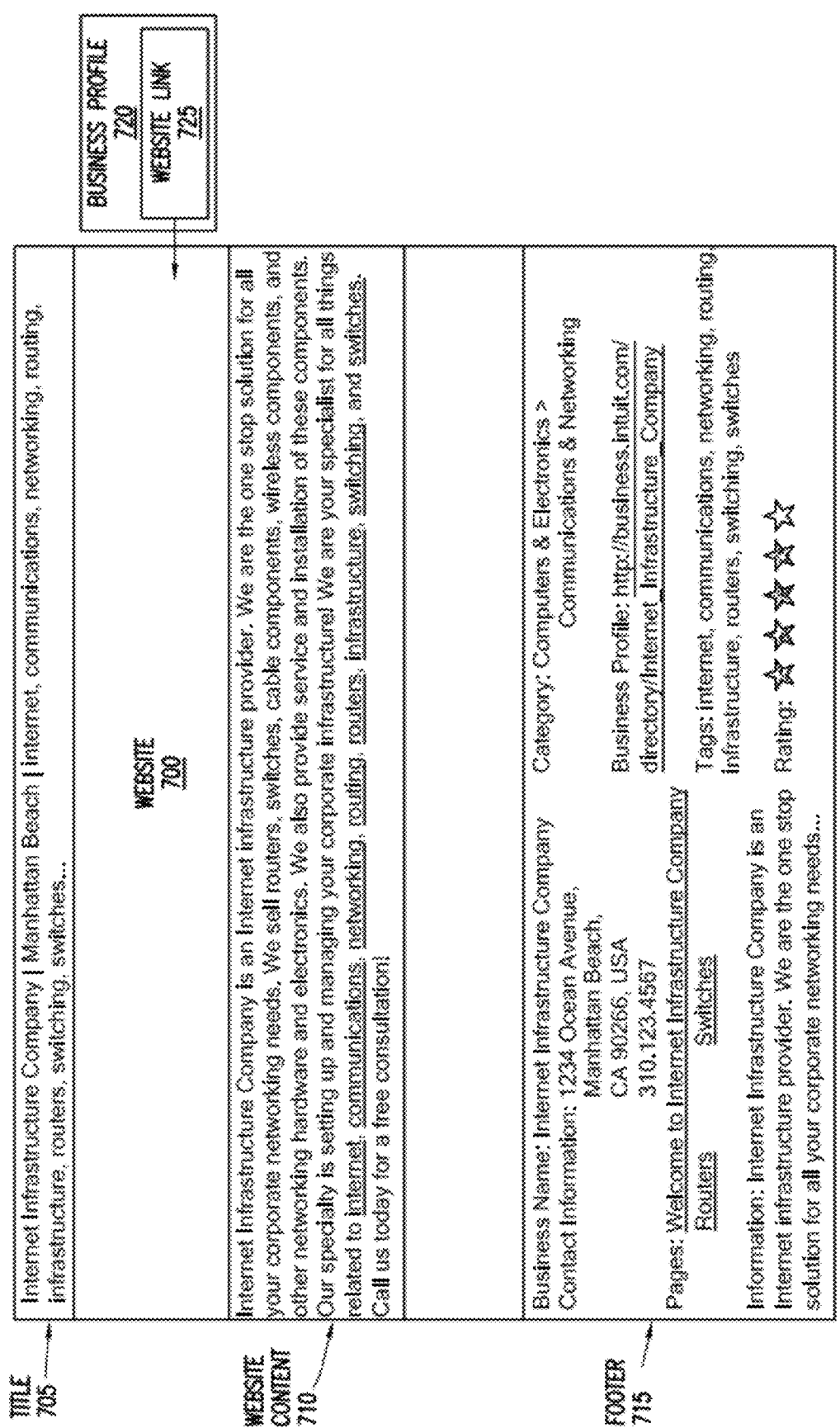
FIG. 7 shows an example of a website in accordance with one or more embodiments of the invention.

FIG. 7 shows an example website in accordance with one or more embodiments of the invention. The website shown in FIG. 7 may be used, for example, with the system (100) to obtain a higher search engine ranking than a previous version of the website. The elements shown in FIG. 7 may differ among embodiments of the invention, and one or more of the elements may be optional.

In FIG. 7, a website (700) contains a title (705), website content (710), and a footer (715). The title (705) is generally located at the top of the website (700), is specified in the meta-content of the website, and contains information that describes a business, and which can be used by a search engine to generate a search engine ranking. The title (705) may contain information such as the name of the business, the location of the business, and keywords associated with the business (e.g. "Internet Infrastructure Company|Manhattan Beach|internet, communications, networking, routing, infrastructure, routers, switching, switches . . . "). Those skilled in the art will appreciate that the title (705) may be periodically updated with new keywords in order to obtain a better search engine ranking for the website (700).

In one or more embodiments of the invention, the website also contains website content (710). The website content (710) is generally located in the interior of the website (700), and may contain a description of the business, keywords, as well as other information relating to the business (e.g. "Internet Infrastructure Company is an Internet infrastructure provider. We are the one stop solution for all your corporate networking needs. We sell routers, switches, cable components, wireless components, and other networking hardware and electronics. We also provide service and installation of these components. Our specialty is setting up and managing your corporate infrastructure! We are your specialist for all things related to internet, communications, networking, routing, routers, infrastructure, switching, and switches. Call us today for a free consultation!"). Those skilled in the art will appreciate that the website content (710) may be periodically updated with new keywords and/or other content in order to obtain a better search engine ranking for the website (700). Further, the website (700) may also contain website content from previous versions of the website (700).

In one or more embodiments of the invention, the website also contains a footer (715). The footer may contain information about the business, and is generally located at the bottom of the website (700). The footer (715) may contain information including the business name (e.g. "Internet Infrastructure Company"), contact information for the business (e.g. "1234 Ocean Avenue, Manhattan Beach, Calif., 90266, USA", "310.123.4567"), hyperlinks to specific pages in the website (700) (e.g. "Welcome to Internet Infrastructure Company", "Routers", "Switches"), information about the business (e.g. "Internet Infrastructure Company is an Internet infrastructure provider. We are the one stop solution for all your corporate networking needs . . . "), the category or industry in which the business operates (e.g. "Computers & Electronics>Communications & Networking"), a hyperlink to the business profile (720) of the business (e.g. "http://business.intuit.com/directory/Internet_Infrastructure_Company"), tags or keywords associated with the business (e.g. "internet, communications, networking, routing, infrastructure, routers, switching, switches"), and an average rating assigned to the business by users, as determined by an aggregation of user reviews (e.g. "4/5 stars"). Those skilled in the art will appreciate that there may be various other types of information displayed on the website (700) that have not been described. Essentially, any type of information associated with the business, its products, its services, and its operations may be part of the website (700). Further, the business profile (720) may contain one or more hyperlinks, or website links (725), to the website (700), and individual pages of the website (700). These hyperlinks may contribute to an improved search engine ranking for the website (700).

Figure 8:
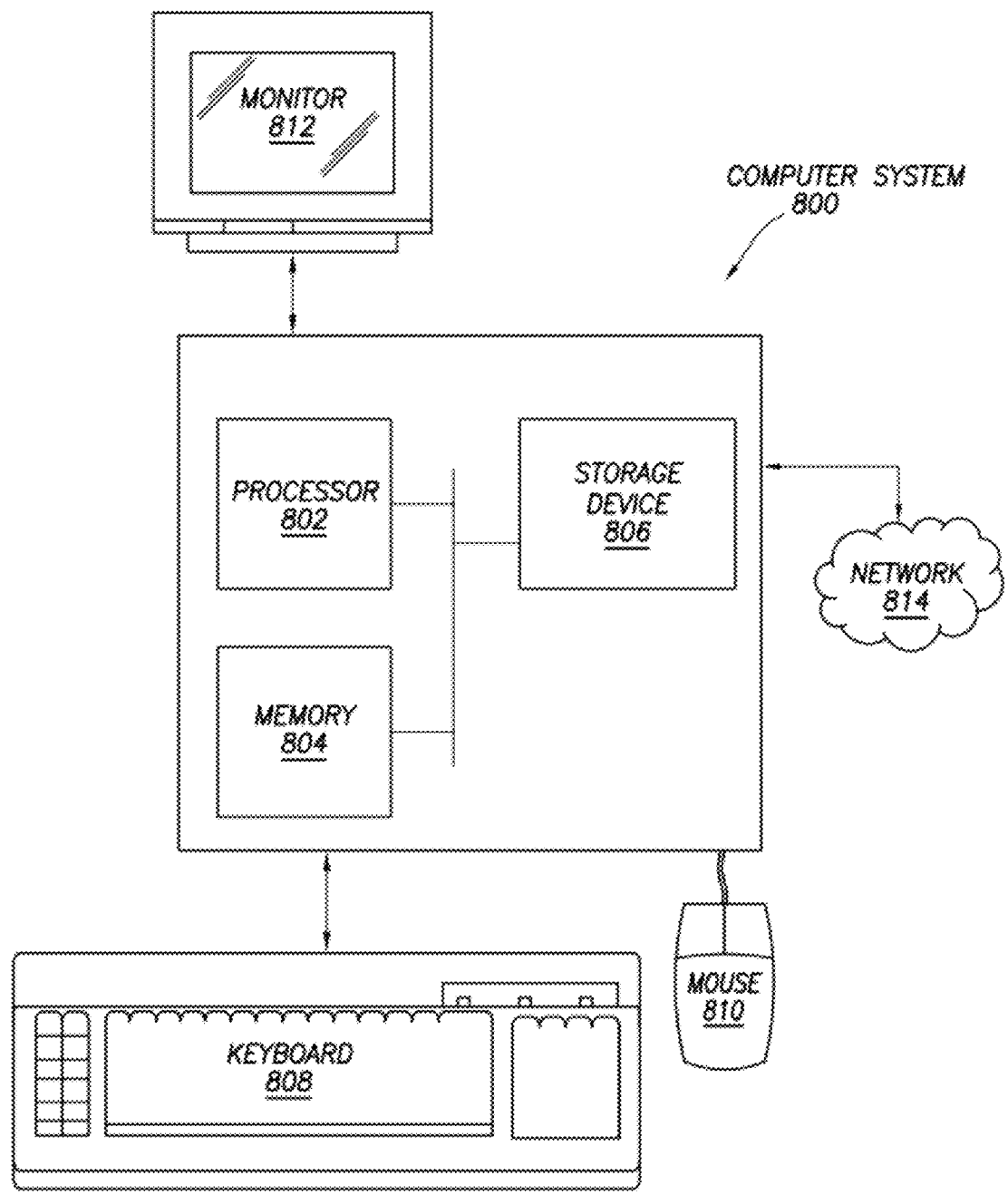
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more processor(s) (802), such as a central processing unit (CPU), integrated circuit, or other hardware processor, an associated memory (804) (e.g. random access memory (RAM), cache memory, flash memory, etc.), a storage device (806) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (802) is hardware. For example, the processor may be an integrated circuit. The computer system (800) may also include input means, such as a keyboard (808), a mouse (810), or a microphone (not shown). Further, the computer system (800) may include output means, such as a monitor (812) (e.g. a liquid crystal display (LCD), a plasma display, or cathode ray tube (CRT) monitor). The computer system (800) may be connected to a network (814) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (800) includes at least the minimal processing, input, and/or output means necessary to practice embodiments of the invention.

Further, in one or more embodiments of the invention, one or more elements of the aforementioned computer system (800) may be located at a remote location and connected to the other elements over a network. Further, embodiments of the invention may be implemented on a distributed system having a plurality of nodes, where each portion of the invention (e.g. a website SEO application, a ranking engine, an information engine, a business profile engine, a keywords engine, a title engine, a footer engine, a website content engine, a website generation engine, an approval engine, a publishing engine, a website update engine, and/or a business profile update engine) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a pre-existing website of a business, comprising:
receiving, from the business, business information comprising a business name, a location, an industry, an address, a phone number, and a business description;

generating a business profile comprising the business information;

obtaining, from a keyword provider, a plurality of keywords relating to the business;

generating a title comprising the business name, the location, and the plurality of keywords;

generating a footer comprising the industry, the address, the phone number, and the plurality of keywords;

generating a website content item comprising the business description and the plurality of keywords;

generating a first modified website based on the pre-existing website of the business,
    wherein the first modified website comprises content from the pre-existing website, the title, the website content item, and the footer, and
    wherein the title is at a top portion of the first modified website, the website content item is in an interior portion of the first modified website, and the footer is at an exterior portion of the first modified website;

publishing the first modified website to a network; and inserting, into the business profile, a first hyperlink comprising a first uniform resource locator (URL) pointing to a first network location of the first modified website.

2. The method of claim 1, further comprising:
determining a first search engine ranking of the pre-existing website;
determining a second search engine ranking of the first modified website; and
determining that the second search engine ranking exceeds the first search engine ranking.

3. The method of claim 1, further comprising:
performing, using the business information, a search for the business;
failing to identify a pre-existing business profile related to the business information;
obtaining a plurality of online reviews of the business from a plurality of sources; and
inserting the plurality of online reviews into the business profile.

4. The method of claim 1, further comprising:
identifying a pre-existing business profile related to the business information; and
associating the business with the pre-existing business profile.

5. The method of claim 1, further comprising:
receiving, from the business, an approval to publish the first modified website.

6. The method of claim 1, further comprising:
receiving, from the keyword provider, a plurality of modified keywords relating to the business after publishing the first modified website to the network;
generating a modified title comprising the business name, the location, and the plurality of modified keywords;
generating a modified footer comprising the industry, the address, the phone number, and the plurality of modified keywords;
generating a modified website content item comprising the business description and the plurality of modified keywords;
generating a second modified website based on the first modified website comprising content from the first modified website, content from the pre-existing website, the modified title, the modified website content item, and the modified footer, wherein the modified title is at the top portion of the second modified website, the modified website content item is in the interior portion of the second modified website, and the modified footer is at the exterior portion of the second modified website;
publishing, without an approval from the business, the second modified website to the network; and
inserting, into the business profile, a second hyperlink comprising a second URL pointing to a second network location of the second modified website.

7. The method of claim 6, further comprising:
determining a third search engine ranking of the second modified website; and
determining that the third search engine ranking exceeds a second search engine ranking of the first modified website.

8. The method of claim 6, further comprising:
obtaining a plurality of updated online reviews of the business; and
generating a modified business profile comprising the information, the plurality of updated online reviews, and the second hyperlink to the second modified website.

9. The method of claim 1, further comprising:
updating, without an approval from the business and in first modified website, the plurality of keywords with a plurality of improved keywords; and
determining a second search engine ranking associated with the plurality of improved keywords that exceeds a first search engine ranking associated with the plurality of keywords.

10. The method of claim 1, further comprising:
updating, without an approval from the business and in first modified website, the title with a plurality of improved keywords;
updating, without the approval from the business and in first modified website, the footer with the plurality of improved keywords;
updating, without the approval from the business and in first modified website, the website content item with the plurality of improved keywords; and
determining a second search engine ranking associated with the plurality of improved keywords that exceeds a first search engine ranking associated with the plurality of keywords.

11. A system for managing a pre-existing website of a business, comprising:
a processor; and
a website SEO application executing on the processor and configured to:
    receive, from the business, business information comprising a business name, a location, an industry, an address, a phone number, and a business description;
    generate a business profile comprising the business information;
    obtain, from a keyword provider, a plurality of keywords relating to the business;
    generate a title comprising the business name, the location, and the plurality of keywords;
    generate a footer comprising the industry, the address, the phone number, and the plurality of keywords;
    generate a website content item comprising the business description and the plurality of keywords;
    generate a first modified website based on the pre-existing website of the business,
        wherein the first modified website comprises content from the pre-existing website, the title, the website content item, and the footer, and
        wherein the title is at a top portion of the first modified website, the website content item is in an interior portion of the first modified website, and the footer is at an exterior portion of the first modified website;

publish the first modified website to a network; and insert, into the business profile, a first hyperlink comprising a first uniform resource locator (URL) pointing to a first network location of the first modified website.

12. The system of claim 11, wherein the website SEO application is further configured to:
 determine a first search engine ranking of the pre-existing website;
 determine a second search engine ranking of the first modified website; and
 determine that the second search engine ranking exceeds the first search engine ranking.

13. The system of claim 11, wherein the website SEO application is further configured to:
 perform, using the business information, a search for the business;
 fail to identify a pre-existing business profile related to the business information;
 obtain a plurality of online reviews of the business from a plurality of sources; and
 insert the plurality of online reviews into the business profile.

14. The system of claim 11, wherein the website SEO application is further configured to:
 identify a pre-existing business profile related to the business information; and
 associate the business with the pre-existing business profile.

15. The system of claim 11, wherein the website SEO application is further configured to:
 receive, from the business, an approval to publish the first modified website.

16. The system of claim 11, wherein the website SEO application is further configured to:
 receive, from the keyword provider, a plurality of modified keywords relating to the business after publishing the first modified website to the network;
 generate a modified title comprising the business name, the location, and the plurality of modified keywords;
 generate a modified footer comprising the industry, the address, the phone number, and the plurality of modified keywords;
 generate a modified website content item comprising the business description and the plurality of modified keywords;
 generate a second modified website based on the first modified website comprising content from the first modified website, content from the pre-existing website, the modified title, the modified website content item, and the modified footer, wherein the modified title is at the top portion of the second modified website, the modified website content item is in the interior portion of the second modified website, and the modified footer is at the exterior portion of the second modified website;
 publish, without an approval from the business, the second modified website to the network; and
 insert, into the business profile, a second hyperlink comprising a second URL pointing to a second network location of the second modified website.

17. The system of claim 16, wherein the website SEO application is further configured to:
 determine a third search engine ranking of the second modified website; and
 determine that the third search engine ranking exceeds a second search engine ranking of the first modified website.

18. A non-transitory computer readable storage medium storing instructions for managing a pre-existing website of a business, the instructions executable on a processor and comprising functionality to:
 receive, from the business, business information comprising a business name, a location, an industry, an address, a phone number, and a business description;
 generate a business profile comprising the business information;
 obtain, from a keyword provider, a plurality of keywords relating to the business;
 generate a title comprising the business name, the location, and the plurality of keywords;
 generate a footer comprising the industry, the address, the phone number, and the plurality of keywords;
 generate a website content item comprising the business description and the plurality of keywords;
 generate a first modified website based on the pre-existing website of the business,
  wherein the first modified website comprises content from the pre-existing website, the title, the website content item, and the footer, and
  wherein the title is at a top portion of the first modified website, the website content item is in an interior portion of the first modified website, and the footer is at a bottom portion of the first modified website;
 publish the first modified website to a network; and
 insert, into the business profile, a first hyperlink comprising a first uniform resource locator (URL) pointing to a first network location of the first modified website.

19. The non-transitory computer readable storage medium of claim 18, the instructions further comprising functionality to:
 determine a first search engine ranking of the pre-existing website;
 determine a second search engine ranking of the first modified website; and
 determine that the second search engine ranking exceeds the first search engine ranking.

20. The non-transitory computer readable storage medium of claim 18, the instructions further comprising functionality to:
 perform, using the business information, a search for the business;
 fail to identify a pre-existing business profile related to the business information;
 obtain a plurality of online reviews of the business from a plurality of sources; and
 insert the plurality of online reviews into the business profile.

21. The non-transitory computer readable storage medium of claim 18, the instructions further comprising functionality to:
 receive, from the keyword provider, a plurality of modified keywords relating to the business after publishing the first modified website to the network;
 generate a modified title comprising the business name, the location, and the plurality of modified keywords;
 generate a modified footer comprising the industry, the address, the phone number, and the plurality of modified keywords;
 generate a modified website content item comprising the business description and the plurality of modified keywords;

generate a second modified website based on the first modified website comprising content from the first modified website, content from the pre-existing website, the modified title, the modified website content item, and the modified footer, wherein the modified title is at the top portion of the second modified website, the modified website content item is in the interior portion of the second modified website, and the modified footer is at the exterior portion of the second modified website;

publish, without an approval from the business, the second modified website to the network; and insert, into the business profile, a second hyperlink comprising a second URL pointing to a second network location of the second modified website.

22. The non-transitory computer readable storage medium of claim 21, the instructions further comprising functionality to:

determine a third search engine ranking of the second modified website; and determine that the third search engine ranking exceeds a second search engine ranking of the first modified website.

23. The non-transitory computer readable storage medium of claim 21, the instructions further comprising functionality to:

obtain a plurality of updated online reviews of the business; and generate a modified business profile comprising the information, the plurality of updated online reviews, and the second hyperlink to the second modified website.

24. The non-transitory computer readable storage medium of claim 18, the instructions further comprising functionality to:

update, without an approval from the business and in first modified website, the plurality of keywords with a plurality of improved keywords; and determine a second search engine ranking associated with the plurality of improved keywords that exceeds a first search engine ranking associated with the plurality of keywords.

25. The non-transitory computer readable storage medium of claim 18, the instructions further comprising functionality to:

update, without an approval from the business and in first modified website, the title with a plurality of improved keywords;

update, without the approval from the business and in first modified website, the footer with the plurality of improved keywords;

update, without the approval from the business and in first modified website, the website content item with the plurality of improved keywords; and determine a second search engine ranking associated with the plurality of improved keywords that exceeds a first search engine ranking associated with the plurality of keywords.

* * * * *